Sept. 30, 1952  B. J. DROZINSKI  2,612,094
POWER ROTOR AND DEPTH ADJUSTMENT THEREFOR
Filed Oct. 28, 1948  2 SHEETS—SHEET 1

INVENTOR.
BRONISLAW J. DROZINSKI
BY Fay, Golrick & Fay
ATTORNEYS

Sept. 30, 1952     B. J. DROZINSKI     2,612,094
POWER ROTOR AND DEPTH ADJUSTMENT THEREFOR
Filed Oct. 28, 1948     2 SHEETS—SHEET 2

INVENTOR.
BRONISLAW J. DROZINSKI
BY Fay, Golrick & Fay
ATTORNEYS

Patented Sept. 30, 1952

2,612,094

UNITED STATES PATENT OFFICE 2,612,094

POWER ROTOR AND DEPTH ADJUSTMENT THEREFOR

Bronislaw J. Drozinski, Cleveland, Ohio

Application October 28, 1948, Serial No. 56,997

2 Claims. (Cl. 97—40)

The present invention relates to a ground pulverizing machine for conditioning soil for planting.

An object of the present invention is to provide a machine for working plowed ground so that disking, harrowing or raking is unnecessary to condition the soil for planting.

Another object of the invention is to provide a ground pulverizing machine in which the pulverizing element may be easily raised and lowered from working contact with the ground.

A further object of the invention is to provide a ground pulverizing machine in which the pulverizing element while in operation, may move freely vertical relative to the framework supporting the elements to accommodate changes in level of the ground.

Other objects and advantages of the invention will be apparent in the following description of a preferred form of the invention, reference being made to the accompanying drawings wherein:

Fig. 3 is a fragmentary side view of the ground pulverizing element; and

Figure 1:
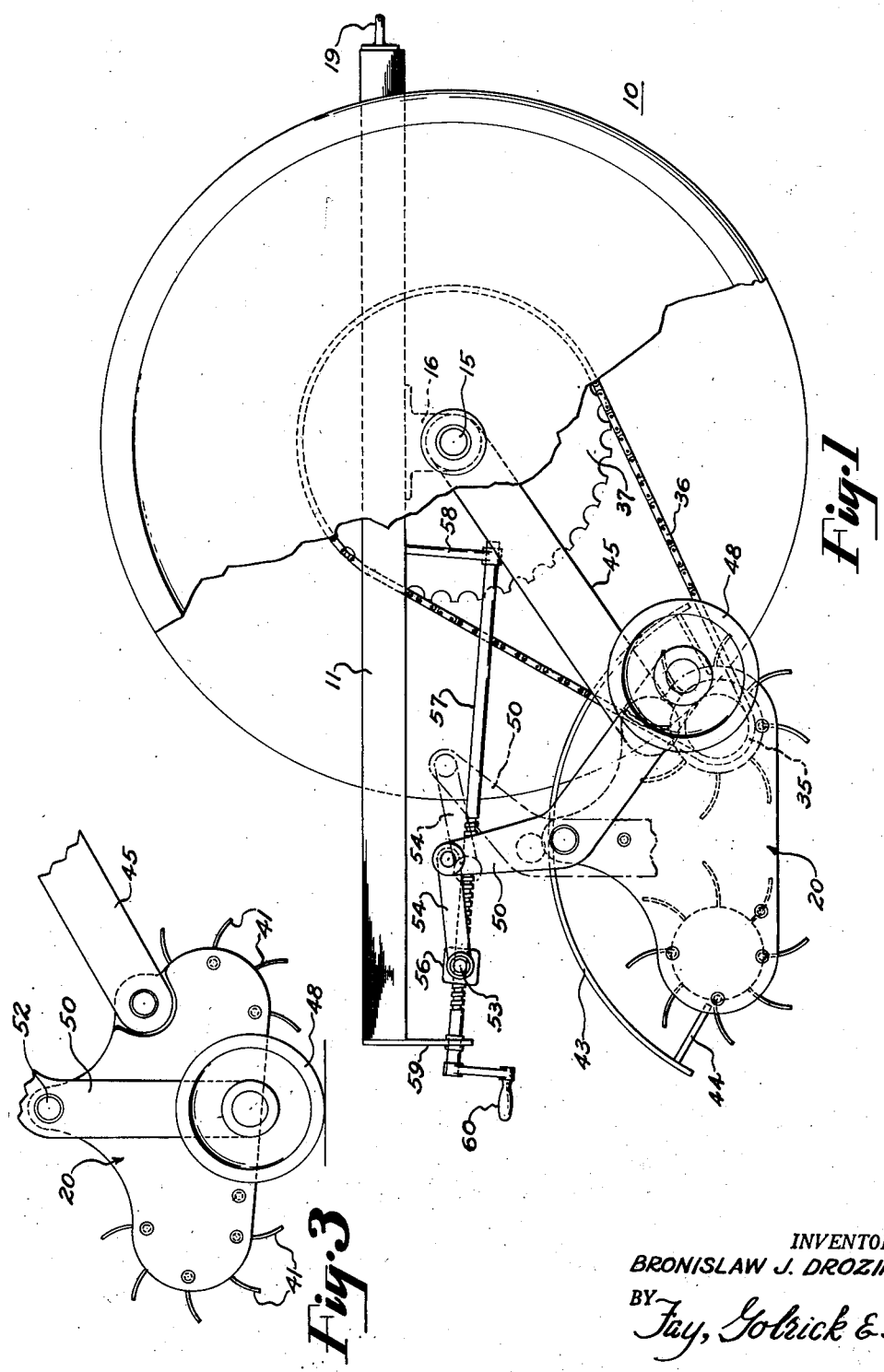
Fig. 1 is a side view of a ground pulverizing machine, certain parts being broken away.
Figure 2:
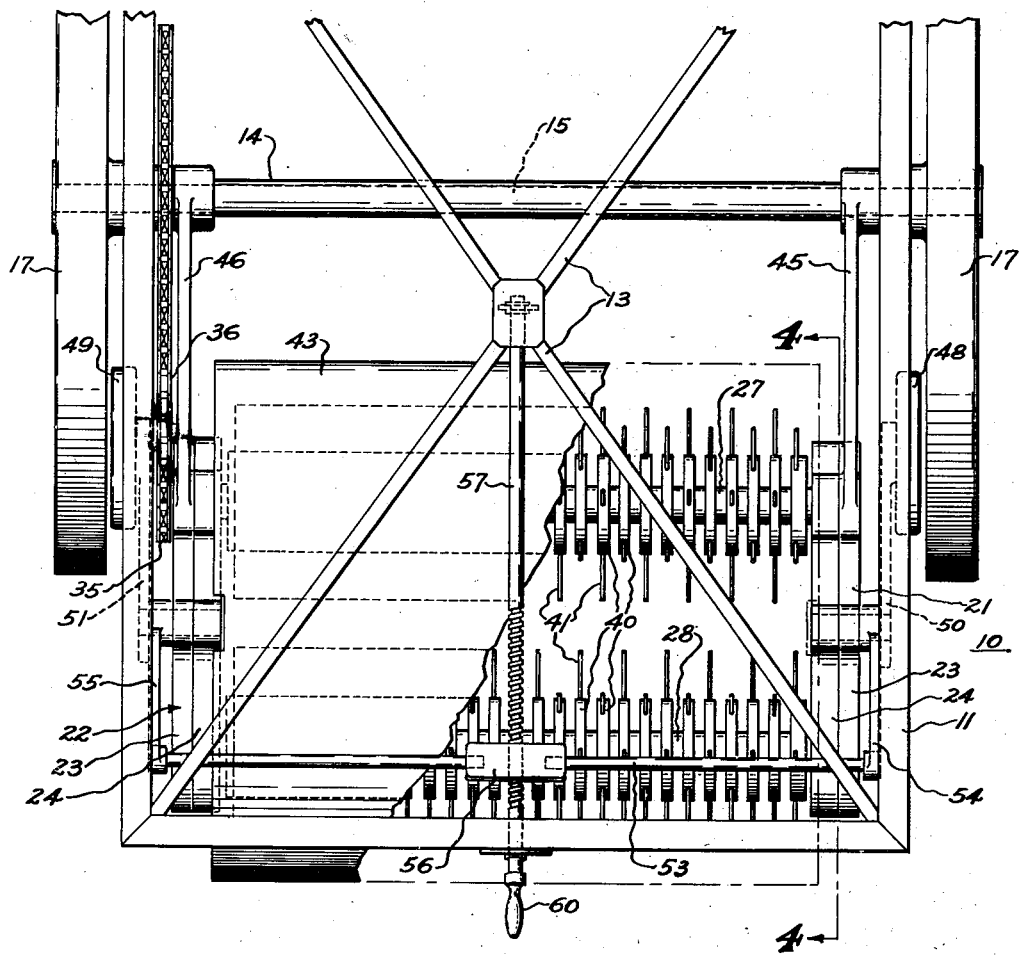
Fig. 2 is a top plan view of the machine shown in Fig. 1, with certain other parts being shown broken away.

Although it is to be understood that my invention can be embodied in many different forms of structures, for the purpose of illustrating the invention I have shown a ground pulverizing machine indicated generally at 10. The machine comprises in general, a frame mounted on ground wheels and adapted to be pulled by a tractor, for example. A pulverizing element is carried by the frame and provisions are made whereby this element may be raised and lowered relative to the frame for moving the machine while maintaining the pulverizer inoperative and to also accommodate the pulverizer to irregularities of the ground while in operation. The frame, indicated at 11, is preferably rectangular and formed of channel iron welded together, and it is provided with cross braces 13 which interconnect opposite corners. An axle 15, enclosed in a tubular housing 14, is journalled to the frame by bearings 16 and the ground wheels 17 are mounted to opposite ends of the axle. Preferably, the frame 11 is provided with a suitable coupling member for attaching the machine to the tractor, and in the present instance this coupling comprises an eye 19.

Figure 4:
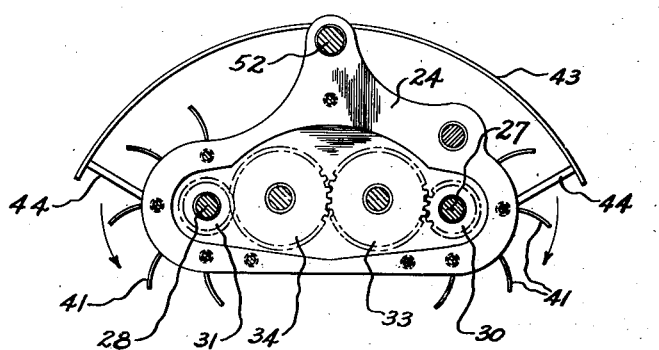
Fig. 4 is a view taken on line 4—4 of Fig. 2.

The ground pulverizing element is shown generally at 20 and this element consists of two oppositely disposed gear casings 21 and 22 which are mounted at opposite sides of the machine in a manner described hereinafter. The casings 21 and 22 are each formed of two complementary shells 23 and 24 which are bolted together at the rims thereof to form housings for gear drives. Two parallel axles 27 and 28 are journalled in the casings 21 and 22 and gears 30 and 31 are keyed to the ends of the respective axles. The gears 30 and 31 mesh respectively with idler gears 33 and 34 which are mounted in the casings and which are in mesh with one another so that axles 27 and 28 will be rotated in opposite directions and at equal speeds. Preferably, the axle 27 rotates in the same direction as axle 15 so that the axles of the element 20 will rotate as indicated by the arrows in Fig. 4. One end of the axle 27 extends outwardly through the casing 22 and a chain sprocket 35 is keyed thereto. The sprocket 35 is driven by a chain 36 mounted on a relatively large sprocket 37 which is keyed to the axle 15 and which is adapted to be rotated by the ground wheel 17. The ratios between the diameters of the sprockets 35 and 37 are such that sprocket 35 is rotated at least four or five times faster than the drive wheel 17. Although not shown, it may be desirable to provide a clutch between the axle 15 and the sprocket 37 whereby power transmission on to the pulverizing element can be effected or discontinued, as desired.

Each of the axles 27 and 28 are provided with a plurality of closely spaced disks 40 and tines 41 extend radially from the disks. These tines are adapted to dig into the earth and break up the ground into fine pieces as the axles 27 and 28 are rotated. Preferably, the tines are curved as shown in the drawing to facilitate penetration into the ground. In this connection I prefer that the speed of rotation of the axles 27 and 28 is such that the speed of the tines 41 at their ends is materially greater than the speed at which the machine is travelling over the ground and the ratio of the diameters of the sprockets 35 and 37 should be established to bring this condition about. By this arrangement the soil will be broken up into fine pieces and any clods will be caught between the tines projecting toward one another from the spaced axles. The tines will penetrate several inches into the soil due to the weight of the casings and axles and provide an exceptionally suitable bed for planting.

Preferably, an arcuate shaped hood 43 is mounted over the pulverizing element to prevent scattering of the dirt picked up by the tines 41. The hood 43 is supported by brackets 44 attached to the casings 21 and 22.

The pulverizing element 20 is mounted to the frame by a pair of arms 45 and 46 which are pivotally connected at one end to the axle 15 and the opposite end being pivotally connected to the forward portions of the casings 21 and 22 respectively. By this arrangement the pulverizing element may swing vertically to thereby accommodate itself to irregularities in the ground while the element is in operative position.

In order to move the machine to and from the working site the pulverizing element may be elevated above the ground and retained in its inoperative position by a pair of wheels 48 and 49 which are mounted to the respective casings 21 and 22 by levers or bell cranks 50 and 51 which are pivoted to the respective casings as at 52. The upper ends of the bell cranks 50 and 51 are each connected to a cross bar 53 by links 54 and 55. The cross bar 53 is provided with a block 56 at the central part thereof which has a threaded opening therethrough and is threaded on an adjusting shaft 57. The shaft 57 is journalled at one end to a bracket 58 carried by the axle housing 14 and is journalled at the opposite end by a bracket 59 which is attached to the frame 11. The end of the shaft 57 supported by the bracket 59 is provided with a crank 60 by which the shaft 57 may be rotated for causing the cross bar 53 to travel in one direction or the other longitudinally of the shaft. When the cross bar 53 is moved to the right as viewed in Fig. 1, the wheels 48 and 49 will be lowered to the ground thereby causing the casings 21 and 22 to be raised. This elevated position is indicated in Fig. 3 and the positions of the bell cranks 50 and 51, links 54 and 55, and cross bar 53 are illustrated in broken lines in Fig. 1. When in this position the machine may be wheeled from one place to the other with the pulverizing element in an inoperative position.

Thus, it will be seen that by my invention a relatively simple structure is provided which will thoroughly break up a top layer of soil and condition the same for planting. The machine is suitable for treating plowed ground to break up the clods and effect a leveling of the furrows so that disking, harrowing or raking will be unnecessary. In some instances where the soil is of a loose nature, the machine may be used without first plowing the ground. In either event, considerable time and labor will be effected by the use of my invention.

It is to be understood that although I have described but one form of the invention, other forms might be adopted, all falling within the scope of the claims which follow.

I claim:
1. A ground pulverizing machine comprising, a frame; a pair of gear casings oppositely disposed from one another and located on opposite sides of the machine; a pair of tandem ground engaging rotor elements having opposite ends thereof mounted in said casings; a pair of bell cranks for supporting said gear casings at the apexes of said bell cranks; link means pivotally interconnecting said bell cranks and said frame whereby said bell cranks and the casings supported thereby may move vertically relative to said frame; and means for simultaneously raising or lowering said gear casings relative to the ground.

2. A ground pulverizing machine comprising, two main support wheels; an axle interconnecting said wheels; a frame mounted about said axle; a pair of gear casings oppositely disposed from one another and located on opposite sides of the machine; ground engaging rotor elements disposed in tandem and having opposite ends thereof mounted in said casings; a pair of bell cranks for pivotally and conjointly supporting said gear casings at the apexes of said bell cranks; a longitudinally extending worm shaft mounted to said frame; link means pivotally interconnecting said worm shaft and the top leg of each of said bell cranks, said link means being adapted for longitudinal movement on said shaft whereby said bell cranks can be pivotally moved about their apex for raising or lowering said casings relative to the frame; ground wheels journalled on the lower leg end of each of said bell cranks; a pair of arms pivotally interconnecting said casings and the axle of the main support wheels for pivotally and conjointly supporting said casings in conjunction with said bell cranks, said bell cranks being adapted to bring said ground wheels beneath the bottom level of said rotor elements when said link means are moved in one direction on said worm shaft and to bring said ground wheels above the bottom level of said rotor elements when said link means are moved in the opposite direction on said shaft; and driving means for rotating said rotor elements.

BRONISLAW J. DROZINSKI.

REFERENCES CITED

The following references are of record in the file of this patent:

UNITED STATES PATENTS

| Number | Name | Date |
|---|---|---|
| 1,244,531 | Menzenbach | Oct. 30, 1917 |
| 2,045,376 | Stanelle | June 23, 1936 |
| 2,141,805 | White | Dec. 27, 1938 |